US007840289B2

(12) United States Patent
Buil et al.

(10) Patent No.: US 7,840,289 B2
(45) Date of Patent: Nov. 23, 2010

(54) MEDIA ITEM SELECTION

(75) Inventors: Vincentius Paulus Buil, Eindhoven (NL); Lucas Jacobus Franciscus Geurts, Eindhoven (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 431 days.

(21) Appl. No.: 10/569,722

(22) PCT Filed: Aug. 23, 2004

(86) PCT No.: PCT/IB2004/051529

§ 371 (c)(1),
(2), (4) Date: Feb. 24, 2006

(87) PCT Pub. No.: WO2005/022528

PCT Pub. Date: Mar. 10, 2005

(65) Prior Publication Data

US 2006/0224259 A1 Oct. 5, 2006

(30) Foreign Application Priority Data

Sep. 1, 2003 (EP) ................................. 03103260

(51) Int. Cl.
*G06F 17/00* (2006.01)
(52) U.S. Cl. ....................................................... 700/94
(58) Field of Classification Search ................... 700/94
See application file for complete search history.

(56) References Cited

U.S. PATENT DOCUMENTS 4,766,580 A * 8/1988 Go et al. ........................ 369/21
5,696,964 A * 12/1997 Cox et al. ...................... 707/5
5,969,283 A * 10/1999 Looney et al. ................ 84/609
5,986,200 A * 11/1999 Curtin .......................... 84/609
6,262,736 B1 * 7/2001 Nelson ....................... 715/854
6,636,246 B1 * 10/2003 Gallo et al. ................. 715/805

(Continued)

FOREIGN PATENT DOCUMENTS

GB          2356283 A1    5/2001

(Continued)

*Primary Examiner*—Suhan Ni
*Assistant Examiner*—Paul McCord

(57) ABSTRACT

Creating a playlist of media items for a desired perceiving experience requires many actions for searching and selecting media items that fit the desired perceiving experience. The invention provides an alternative for creating a perceiving experience without the use of a playlist. To this end, the invention provides a method (1) for selecting a media item from a plurality of media items, each of the plurality of media items being linked to at least one out of a plurality of content related attribute-value pairs, the method (1) comprising the steps of defining (10) for at least one attribute of said plurality of attribute-value pairs at least two desired probabilities of selecting a media item having a predetermined value for said at least one attribute, resulting in a desired probability distribution (22) of at least two predetermined values for which a desired probability has been defined, selecting (14) an actual value from said at least two predetermined values in accordance with said desired probability distribution (22), and selecting (16) one of said plurality of media items having an attribute-value pair corresponding to said actual value and the attribute linked to said actual value. The invention further provides a system (1) and a media player (5) for selecting a media item.

18 Claims, 3 Drawing Sheets

U.S. PATENT DOCUMENTS

| | | | |
|---|---|---|---|
| 6,657,116 B1 * | 12/2003 | Gunnerson | 84/615 |
| 6,662,231 B1 * | 12/2003 | Drosset et al. | 709/229 |
| 6,665,442 B2 * | 12/2003 | Sekiguchi et al. | 382/224 |
| 6,819,344 B2 * | 11/2004 | Robbins | 715/848 |
| 6,910,220 B2 * | 6/2005 | Hickey et al. | 725/39 |
| 7,000,188 B1 * | 2/2006 | Eustace | 715/716 |
| 7,013,238 B1 * | 3/2006 | Weare | 702/182 |
| 7,013,435 B2 * | 3/2006 | Gallo et al. | 715/850 |
| 7,076,561 B1 * | 7/2006 | Rosenberg et al. | 709/231 |
| 7,260,823 B2 * | 8/2007 | Schlack et al. | 725/9 |
| 7,345,232 B2 * | 3/2008 | Toivonen et al. | 84/615 |
| 2002/0032019 A1 | 3/2002 | Marks | |
| 2002/0045960 A1 | 4/2002 | Phillips | |
| 2002/0054164 A1 * | 5/2002 | Uemura | 345/848 |
| 2002/0093884 A1 | 7/2002 | Hochendoner | |
| 2002/0103796 A1 | 8/2002 | Hartley | |
| 2003/0014407 A1 * | 1/2003 | Blatter et al. | 707/6 |
| 2003/0018755 A1 * | 1/2003 | Masterson et al. | 709/220 |
| 2003/0033420 A1 * | 2/2003 | Eyal et al. | 709/231 |
| 2003/0236582 A1 * | 12/2003 | Zamir et al. | 700/94 |
| 2004/0009813 A1 * | 1/2004 | Wind | 463/30 |
| 2004/0024478 A1 * | 2/2004 | Hans et al. | 700/94 |
| 2004/0053661 A1 * | 3/2004 | Jones et al. | 463/16 |
| 2004/0131333 A1 * | 7/2004 | Fung et al. | 386/69 |
| 2004/0153660 A1 * | 8/2004 | Gaither et al. | 713/200 |
| 2004/0260682 A1 * | 12/2004 | Herley et al. | 707/3 |
| 2005/0003879 A1 * | 1/2005 | Jaffe et al. | 463/16 |
| 2005/0038819 A1 * | 2/2005 | Hicken et al. | 707/104.1 |
| 2005/0114901 A1 * | 5/2005 | Yui et al. | 725/100 |
| 2005/0164764 A1 * | 7/2005 | Ghaly | 463/16 |
| 2006/0130117 A1 * | 6/2006 | Lee et al. | 725/135 |
| 2008/0027953 A1 * | 1/2008 | Morita et al. | 707/100 |

FOREIGN PATENT DOCUMENTS

| | | |
|---|---|---|
| JP | 09330586 A1 | 12/1997 |
| JP | 2001043666 A1 | 2/2001 |
| WO | WO02087214 A3 | 10/2002 |

* cited by examiner

MEDIA ITEM SELECTION

The invention relates to selecting a media item from a plurality of media items. The invention further relates to a media player.

In a media player, for example in an MP3-player, a playlist is often created by a user in order to create a perceiving experience which fits a certain situation. For example, the playlist may be a plurality of media items that fit a party, a romantic evening, or jogging. From the plurality of media items, the media player selects a media item which selection may be a random selection. In US patent application US 2002/0045960 A1, a media player is presented which implements a method for creating a playlist or alternating an existing playlist. The presented media player plays audio tracks, which audio tracks are associated with one or more metatags that are used to describe the content of each track. Examples of metatags are the artist's name, song title, album title, and date. When creating a new playlist, the user may select a metatag. The media player then creates a playlist by adding all songs to the playlist that correspond to the selected metatag, for example all songs from a selected artist. Alternatively, the user may create a playlist by selecting a plurality of songs from the songs having a metatag which corresponds to the selected metatag.

It is an object of the present invention to provide a selection of a media item from a plurality of media items in an advantageous manner. To this end, the invention provides a method, a system and a media player as specified in the independent claims. Advantageous embodiments are defined in the dependent claims.

When a user of a media player like an MP3 player or a Compact Disc player wishes to create a perceiving experience that fits a certain situation, he needs to create a playlist suitable for the occasion. The creation of such a playlist requires many actions for searching and selecting media items that fit the intended situation. Furthermore, the creation of a suitable playlist requires knowledge of the user about his available collection of media items. For example when the media items are music songs the user needs to have musical knowledge about the available collection of music songs like for example style, artist, year of release etc. Furthermore, every new situation or new mood requires creating a new playlist. A playlist therefore does not provide a flexible solution for creating a desired perceiving experience. It will be advantageous to select media items for creating a desired perceiving experience without the need of creating a playlist. According to an aspect of the invention, a method for selecting a media item from a plurality of media items is provided, each of the plurality of media items being linked to at least one out of a plurality of content related attribute-value pairs, the method comprising the steps of defining for at least one attribute of said plurality of attribute-value pairs at least two desired probabilities of selecting a media item having a predetermined value for said at least one attribute, resulting in a desired probability distribution of at least two predetermined values for which a desired probability has been defined, selecting an actual value from said at least two predetermined values in accordance with said desired probability distribution, and selecting one of said plurality of media items having an attribute-value pair corresponding to said actual value and the attribute linked to said actual value. Each of the plurality of media items are linked to at least one out of a plurality of attribute-value pairs. For example, the media items may be music songs, which music songs can be linked to for example at least one of the attributes artist, style, genre, tempo, tempo-range, instruments used, popularity, number of times played, time of release, release year, and release decade. For a media item, the attributes are linked to values, for example, a music song can have a value Rap for the attribute Style, and a value Fast for the attribute Tempo. The invention is based on the insight that a perceiving experience can be created without the need of creating a playlist by defining a desired probability distribution of at least two predetermined values. In a relatively easy manner, the user may define a desired perceiving experience by selecting at least one attribute and defining at least two desired probabilities of selecting a media item having a predetermined value for the at least one attribute. For example, a listener to music may define a desired probability distribution of 20 percent Rap, 30 percent Dance and 50 percent Jazz. In this case the values are all linked to the same attribute Style, but it is also possible to define a probability distribution of predetermined values, wherein the predetermined values are linked to a plurality of attributes. For example a listener may define a probability distribution of 20 percent Jamiroquai, 30 percent Dance and 50 percent Jazz. The value Jamiroquai is linked to the attribute Artist and the other values are linked to the attribute Style. Furthermore, it is also possible to define a probability for remaining attribute-value pairs. In that case, the value can be all values except the at least two predetermined values for which a desired probability of selecting has been defined, which values are linked to the attribute Remaining. It may also be possible to define a plurality of desired probability distributions of at least two predetermined values, which desired probability distributions are combined to result in a desired perceiving experience. According to an embodiment of the invention, it may be possible to define a first desired probability distribution defined for a starting moment in time and at least one further desired probability distribution defined for a later moment in time, which first desired probability distribution is adapted over time in accordance with at least one of the at least one further desired probability distribution defined for a later moment in time to obtain an adapted desired probability distribution. The selection of a media item is performed by using the adapted desired probability distribution. By adapting the first probability distribution over time, a changing perceiving experience may be obtained over time. For example, when the music items are songs, the perceiving experience may be a loud music experience at the start of an evening and a romantic music experience at the end of the evening. According to a further embodiment of the invention, at least two desired probability distributions are combined into a combined desired probability distribution, which combined desired probability distribution is used for selecting a media item. For example, two users may each have defined a desired probability distribution, which desired probability distributions may be different from each other. When the users are in the same environment with a single media player for both users, it will be advantageous to combine the two desired probability distributions into a single combined desired probability distribution, which single combined desired probability distribution may be a compromise for both users regarding their desired perceiving experience. The desired probability distributions may be combined by taking an average of probabilities, or adding/deleting predetermined values in dependence on the defined predetermined values and their defined probabilities. It is noted that it may be needed to send information about a desired probability distribution of one user to another user, or to a basis station for combining the desired probability distributions.

When a desired probability distribution of at least two predetermined values is defined, an actual value is selected in accordance with the desired probability distribution of the at least two predetermined values. The actual value and the attribute linked to the actual value are used to select a media item having a corresponding attribute-value pair. When there are a plurality of media items having a corresponding attribute-value pair, a random selection or another type of selection from these media items may be performed. In the examples discussed next, a media player is introduced for playing music songs like MP3 files, but the invention may also be used in other media players, such as video players or digital photo viewers or even radio stations, television stations, Internet services and the like.

In an embodiment of the invention, the desired probability distribution of predetermined values is defined by defining a pie-chart having at least two pie-parts corresponding to the at least two predetermined values, the pie-parts having proportions in dependence on the at least two desired probabilities. The pie-chart can be defined by a user in a relatively easy way. Moreover, the desired perceiving experience may be visually made clear in a relatively easy, user-friendly manner.

In a further embodiment of the invention, the pie-chart is used to visualize the selection procedure to a user by spinning the pie-chart, slowing down the pie-chart until the pie-chart stops at a random position, and selecting the actual value corresponding to a pie-part of the pie-chart in dependence on the position where the pie-chart stopped. This method of visualizing may be compared to the visualization of a wheel of fortune and provides a user-friendly, interactive manner of visualizing the selection procedure. In order to achieve more interactivity with a user, it may be possible for the user to select the moment in time when the spinning pie-chart starts slowing down. Or the user may adjust the speed of slowing down the pie-chart, for example by applying a brake to the spinning pie-chart or adjusting the rolling resistance. Also, the user may apply a hold to a pie-chart in order use the previous selected actual value when selecting the next media item.

The aforementioned and other aspects of the invention will be apparent from and elucidated with reference to the embodiments described hereinafter.

Figure 1:
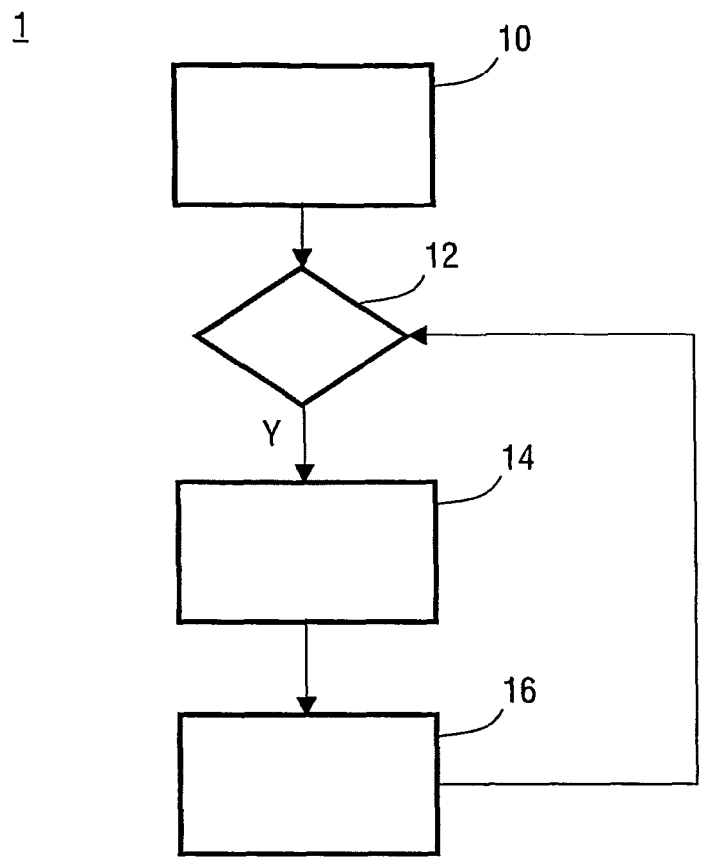
FIG. 1 shows a block diagram representing a method for selecting a media item from a plurality of media items according to an embodiment of the invention.
Figure 2:
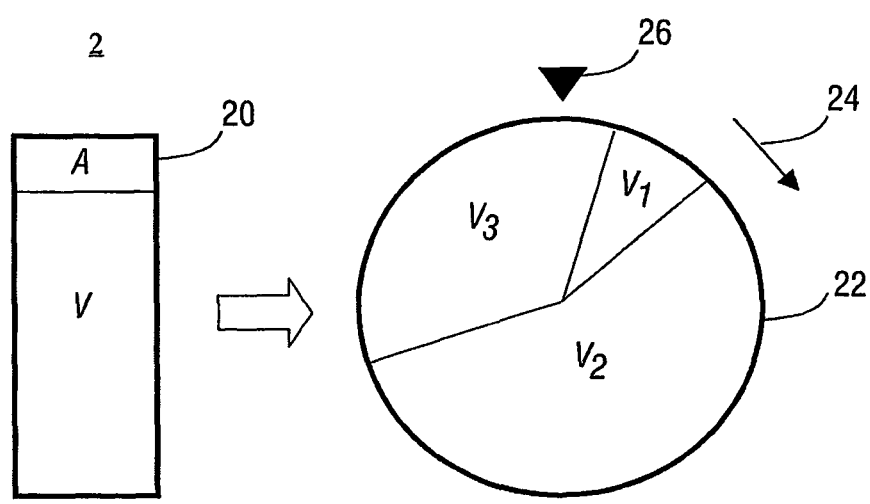
FIG. 2 shows a user interface according an embodiment of the invention.

FIG. 1 shows a block diagram 1 representing a method for selecting a media item from a plurality of media items according to an embodiment of the invention. Each of the media items are linked to content related attribute-value pairs. Examples of attribute-value pairs for a media item such as a music song are the attribute Artist linked to an artist's name as a value like Jamiroquai and the attribute Style linked to a music style as a value like Pop. Examples of attribute-value pairs in the case that a media item is a movie or a part of a movie, are the attribute Actor linked to an actor's name as a value like Anthony Hopkins and the attribute Genre linked to a movie genre as a value like Thriller. Examples of attribute-value pairs in the case that a media item is a picture is the attribute Date linked to a date as a value when the picture was taken like Jan. 30, 2003 and the attribute Dominant Color linked to a dominant color in the picture as a value like Green. The attribute-value pairs may be defined by a user or may be available from other sources like the Internet, for example from the Internet services like CDDB and FreeDB today. In order to avoid unnecessary details in the description, the plurality of media items will be music songs in the following examples. It will be clear to a person skilled in the art that the same examples may hold for other media items such as movies, parts of movies, video clips, or digital pictures. In step 10 of the block diagram 1 a desired probability distribution of predetermined values is defined. The desired probability distribution of predetermined values may be loaded from a set of stored desired probability distributions, which desired probability distributions may be stored by a user or may be available from another source like the Internet. Also, it may be possible that a stored desired probability distribution can be adapted by a user later on. FIG. 2 shows a user interface 2 according to an embodiment of the invention. The user interface 2 may be used to define a desired probability distribution of predetermined values. The user interface 2 comprises a table 20 for representing attribute-value pairs to the user. The table 20 comprises at least one attribute A, for example the attribute Style. The table 20 further comprises at least two values V linked to the at least one attribute A. Examples of values for the attribute Style are music styles like Rap, Dance, R&B, Pop, Rock etc. Also, the value Other can be an option for all remaining music styles that are not selected. The user may select a value from the values V and the selected values, i.e. values $V_1$, $V_2$ and $V_3$ are placed in a pie-chart 22. The values $V_1$, $V_2$, $V_3$ may be for example Rap, Dance and R&B, which values are all linked to the same attribute Style, which is not necessarily the case. The pie-chart 22 comprises for each of the selected values a pie-part $V_1$, $V_2$, $V_3$ which will have proportions, which proportions may be initially equal to each other. In this case the values $V_1$, $V_2$, $V_3$ will each have a proportion of approximately 33%. The proportions of the pie-parts $V_1$, $V_2$, $V_3$ may be changed by the user in dependence on the desired probabilities of selecting a media item having a value corresponding to $V_1$, $V_2$, and $V_3$ respectively. For example, the user may define that he likes to hear 30% Rap songs, 60% Dance songs and 10% R&B songs, which corresponds to pie-proportions 30%, 60%, and 10% for respectively $V_1$, $V_2$, and $V_3$ as shown in FIG. 2. It may also be possible to display these percentages in the corresponding pies. The user may change the proportions by selecting a pie-part by means of for example a mouse pointer and move the mouse pointer towards the center of the pie-chart to decrease or move the mouse pointer away from the center to increase the proportion of the selected pie-part. When changing the proportion of a pie-part, it will be advantageous to maintain the ratio of proportions of other pie-parts. For example, when the user changes the 60% proportion of $V_2$, the 3 to 1 ratio of $V_1$ and $V_3$ should be maintained. Defining of the proportions in step 10 results in a desired probability distribution of predetermined values, in this example of predetermined values $V_1$, $V_2$, and $V_3$.

In step 12 it is decided if a new media item needs to be selected. This may happen when the user indicates by a user input that he likes to hear a next song, or when the previous song has stopped playing, or when the song has come nearly to its end, or after a predetermined time, or when receiving a remote signal. If this is the case (Y), in step 14, an actual value $V_a$ is selected from the predetermined values in accordance with the desired probability distribution of the predetermined values as defined in step 10. In the case of the example, there is a probability of 10% that $V_a$ will be $V_1$, 60% that $V_a$ will be $V_2$, and 30% that $V_a$ will be $V_3$ when a new media item needs to be selected (Y). The selection procedure can be visualized to the user by means of the user interface 2 shown in FIG. 2. When a new media item needs to be selected (Y), the pie-chart 22 can spin at a random speed for example in the direction of arrow 24. The pie-chart then slows down until it stops, comparable with a wheel of fortune. A cursor 26 points to a pie-part of the stopped pie-chart, which predetermined value of the pie-part is selected as the actual value $V_a$, for example $V_a = V_3$ (Rap) as indicated in FIG. 2. As the pie-chart spins at a random speed and/or slows down in a random time-period, the proportions of the pie-parts correspond to the desired probabilities of selecting a predetermined value like in the case of a wheel of fortune. As an option, it may be possible for a user to indicate the speed at which the spinning pie-chart slows down. The user may also adapt the moment in time the spinning pie-chart slows down. Optionally, the user may also hold the pie-chart at its current position, for example by applying a hold button. In that case, no new actual value but the current actual value is used for the further selection procedure. The actual value $V_a$ is used in step 16, wherein a media item is selected having an attribute-value pair corresponding to the actual value $V_a$ and the attribute linked to the actual value $V_a$. In this case the actual value $V_a$ is the value Rap which is linked to the attribute Style. When in the collection of media items that is available for selection, there are more than one media items that correspond to the selected attribute-value pair a further selection need to be performed. This further selection may be a random selection or another type of selection known in the art. The random selection may be constrained by parameters like a parameter if a song has already been played or a parameter if a song has already been played in predetermined elapsed time period. After the selection procedure in step 16, it is again decided in step 12 if a new media item needs to be selected.

Figure 3:
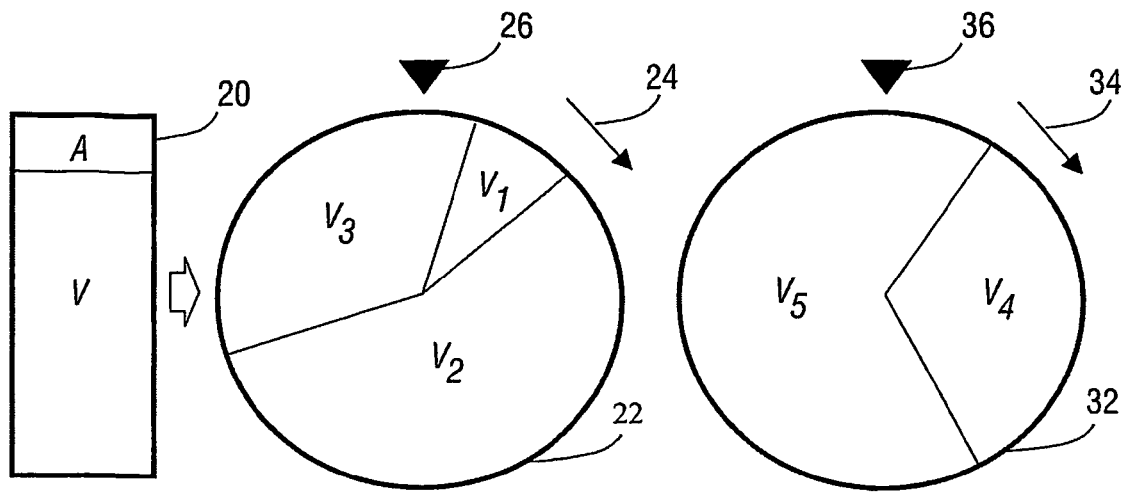
FIG. 3 shows a user interface according to a further embodiment of the invention.

FIG. 3 shows a further user interface 3 according to an embodiment of the invention. The user interface 3 comprises the user interface 2, but a further pie-chart 36 is added. Also in the further pie-chart a desired probability distribution of predetermined values for different attributes may be defined in an equal way to defining pie-chart 22. In this case, pie-chart 32 comprises the predetermined values $V_4$ and $V_5$, which may be the values Slow and Fast respectively linked to the attribute Tempo. The attributes A and possible predetermined values V may be selected from the table 20. When selecting a media item, both pie-charts spin like a wheel of fortune in the directions of arrows 24 and 34 respectively and stop. In this case two predetermined values $V_3$ and $V_5$ are pointed to by cursors 26 and 36 respectively, the two predetermined values $V_3$ and $V_5$ being linked to the different attributes Style and Tempo respectively. The attributes need to be different in order to avoid a conflicting situation like selecting both the values Slow and Fast for the same attribute Tempo. Next, the two selected attribute-value pairs are both used when selecting a media item. For example, a media item is selected when it comprises both selected attribute-value pairs. So, in this case, a song is selected which comprises a value Fast for attribute Tempo and a value Rap for attribute Style. It is also possible to use different desired probability distributions over time. For example, desired probability distribution 22 may be taken as a starting point and desired probability distribution 32 as an ending point of a predetermined time period for playing media items. In this case, it is not necessary that the desired probability distributions are defined for different attributes. When selecting a media item, for example only desired probability distribution 22 is used, which desired probability distribution 22 is gradually transforming into the desired probability distribution 32. This transformation may be visualized by morphing pie-chart 22 into pie-chart 32 over a predetermined time-period. In stead of using two probability distributions, it is also possible to use more than two probability distributions. The transforming of a probability distribution may be performed by adding or deleting predetermined values or by adapting a desired probability of a predetermined value during time. When at least two desired probability distributions are defined, it is also possible to combine the at least two probability distributions into a combined desired probability distribution. For example in the case that two users have defined perceiving experiences by defining two desired probability distributions, which two desired probability distributions may be different from each other. When the two users have to listen to music for example in the same room by the same media player, the two desired probability distributions may be combined with each other in order to obtain a compromise of the two desired perceiving experiences. The combining of the desired probability distributions may be performed by adding or deleting predetermined values or by adapting a desired probability of a predetermined value. For example, all predetermined values from the at least two desired probability distributions may be added in the combined desired probability distribution, or at least the predetermined values may be added that have a desired probability which is larger than a predetermined minimum desired probability. For the desired probabilities the averages may be calculated in order to obtain a compromise of desired probabilities.

Figure 4:
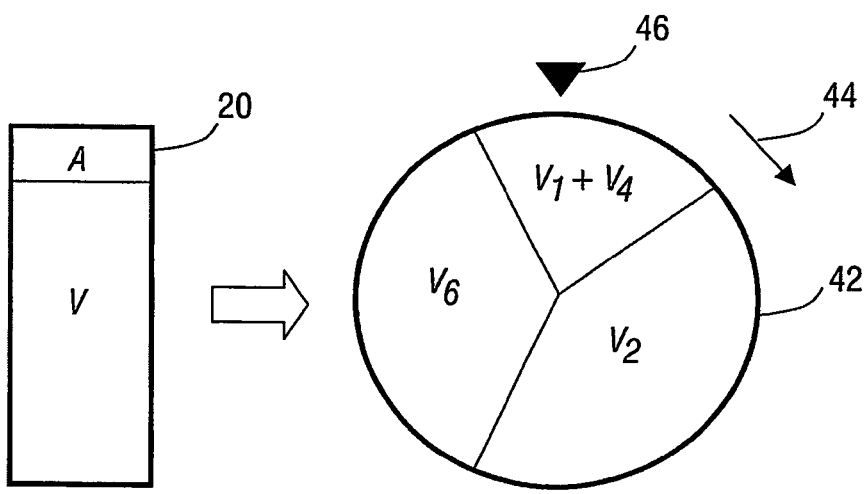
FIG. 4 shows a user interface according an even further embodiment of the invention.

FIG. 4 shows an even further user interface 4 according to an embodiment of the invention. The attributes and values may again be available from table 20. The user-interface 4 shows a probability distribution 42 having a combination of predetermined values in a single pie-part. For example, there is a probability of 20% that a media item is selected having the predetermined values $V_1$ and $V_4$, which may correspond, respectively, to the value R&B for the attribute Style and the value Slow for the attribute Tempo. Other values in the pie-chart 42 may for example be $V_2$, which may be the value Dance for the attribute Style having a desired probability of selecting of 50%, and $V_6$ which may be the value Jamiroquai for the attribute Artist having a desired probability of selecting of 30%. When a media item needs to be selected the pie-chart 42 turns like a wheel of fortune in the direction of arrow 44. The cursor 46 selects the actual value or actual values for selecting the media item.

Figure 5:
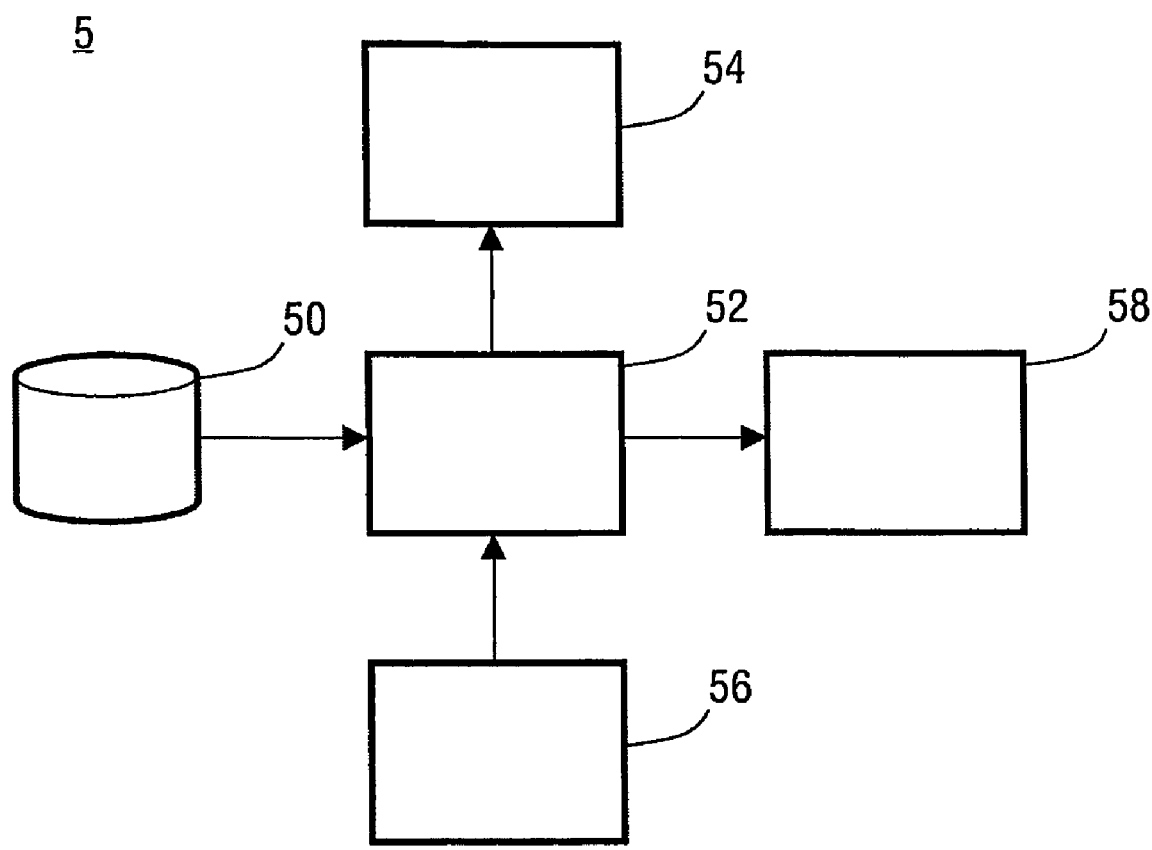
FIG. 5 shows a media player according to an embodiment of the invention.

FIG. 5 shows a media player 5 according to an embodiment of the invention. The media player may be a media player suitable for playing at least one of the media items music songs, MP3-files, Compact Disc songs, movies, DVD-tracks, pictures, and JPG-files or other possible media items. The media player 5 may be implemented in hardware but it is also possible to implement the media player 5 as a software based media player. The media player comprises a communication channel 50 for obtaining media items which may be a wireless connection, a data bus, the Internet or a storage medium. In case the communication channel 50 is a storage medium, the storage medium may be fixed in the system or may also be a removable disc, a memory stick etc. The communication channel 50 may be part of the media player 5, but this is not necessary. The communication channel 50 comprises a plurality of media items and attribute-value pairs that can be linked to the each of the plurality of media items. It may also be possible to store the attribute-value pairs at another communication channel than the communication channel 50. For example, the media items may be stored on a medium as a part of the media player 5 and the attribute-value pairs linked to the media items may be obtained from the Internet. The media player 5 further comprises a selection system 52, which selection system 52 selects a media item according to an embodiment of the invention. A user-interface may be visualized in a display 54. The display may be an LCD display, a CRT monitor, a television or any other display suitable for visualizing a user-interface. The media-player 5 may further comprise an input device 56 which may be a keyboard, a computer mouse, a joystick, a touch-screen or any other suitable input device for obtaining an input from the user. The media player 5 may further comprise a media item playing device 58. The media item playing device 58 may be an amplifier and speaker or headphones for playing songs possibly combined with a TV screen when playing video, or a display screen for displaying digital pictures.

It should be noted that the above-mentioned embodiments illustrate rather than limit the invention, and that those skilled in the art will be able to design many alternative embodiments without departing from the scope of the appended claims. In the claims, any reference signs between parenthesis shall not be construed as limiting the claim. The word 'comprising' does not exclude the presence of other elements or steps than those listed in a claim. The invention can be implemented by means of hardware comprising several distinct elements, and by means of a suitably programmed computer. In a device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method for selecting a media item from a plurality of media items, each of the plurality of media items being linked to at least one of a plurality of content related attribute-value pairs, the method comprising:
   receiving, at a media selecting device, a user input for an attribute of the plurality of attribute-value pairs that sets at least two probabilities of selecting predetermined values of the attribute to user-specified values, resulting in a probability distribution of selection of values of the attribute;
   selecting, by the selecting device, a selected value of the attribute in accordance with the probability distribution; and
   selecting, by the selecting device, the media item from among a plurality of media items having an attribute-value pair corresponding to the selected value of the attribute,
   wherein receiving user input to set the at least two values of probability includes defining and displaying a pie-chart having at least two pie-parts corresponding to the at least two predetermined values, the pie-parts having proportions in dependence on the at least two user-specified probabilities.

2. The method of claim 1, including:
   receiving user input to define at least two values of probability for another attribute, resulting in an other probability distribution of selection of values of the other attribute, and
   selecting a selected value of the other attribute in accordance with the other probability distribution;
   wherein selecting the media item includes selecting the media item from among a plurality of media items having attribute-value pairs corresponding to the selected values of the two attributes.

3. The method of claim 1, including:
   receiving user input to define at least two values of probability for an other attribute, resulting in an other probability distributions of selection of values of the other attribute; and
   combining the two probability distributions into a combined probability distribution;
   wherein selecting the selected value of the attribute includes selecting the selected value of the attribute and selecting another selected value of the other attribute in accordance with the combined probability distribution; and
   selecting the media item includes selecting the media item from among a plurality of media items having attribute-value pairs corresponding to the selected values.

4. The method of claim 1, wherein selecting the selected value includes:
   spinning the pie-chart;
   slowing down the pie-chart until the pie-chart stops at a random position;
   selecting the selected value corresponding to a pie-part of the pie-chart in dependence on the position where the pie-chart stopped.

5. A system for selecting a media item from a plurality of media items, each of the plurality of media items being linked to at least one out of a plurality of content related attribute-value pairs, the system comprising:
   means for receiving a user input for setting, for at least one attribute of the plurality of attribute-value pairs, values of at least two probabilities of selecting predetermined values for the at least one attribute to user-specified values, resulting in a probability distribution of selection of values of the attribute;
   means for selecting an actual value from the at least two predetermined values in accordance with the probability distribution;
   means for selecting the media item from among a plurality of media items having an attribute-value pair corresponding to the actual value of the attribute;
   means for defining a pie-chart having at least two pie-parts corresponding to the at least two predetermined values, the pie-parts having proportions in dependence on the at least two user-specified probabilities; and
   means for displaying the pie-chart.

6. The system of claim 5, the system including:
   means for spinning the pie-chart;
   means for slowing down the pie-chart until the pie-chart stops at a random position; and
   means for selecting the actual value corresponding to a pie-part of the pie-chart in dependence on the position where the pie-chart stopped.

7. The system of claim 6, including means for selecting a moment in time to start the slowing down of the pie chart.

8. The system of claim 6, including means for adjusting a speed of the slowing down the pie-chart.

9. The system of claim 6, including means for holding the pie-chart at a current position for selecting from among a plurality of media items having an attribute-value pair corresponding to a previous selected actual value of the attribute.

10. A system comprising: a communication channel that is configured to receive a plurality of media items, an input device that is configured to facilitate setting values of selection probability associated with members of at least one attribute set associated with the plurality of media items to user-specified values of a first user, a selector that is configured to select a media item from the plurality of media items based on the defined values of selection probability wherein the input device is configured to facilitate defining other values of selection probability by one or more other users, and the selector is configured to select the media item based on a composite of the values and the other values of selection probability and a display that is configured to display a pie-chart corresponding to the selection probabilities and selecting by the selector is illustrated via the spinning of the pie-chart.

11. The system of claim 10, including a media player that is configured to render the select media item.

12. The system of claim 10, wherein the values of selection probability correspond to values at a first time, the other values of selection probability correspond to values at a second time, and the composite of the values is dependent on a selection time relative to the first and second times.

13. The system of claim 10, wherein segments of the pie chart are sized in proportion to the selection probabilities.

14. The system of claim 13, wherein one or more segments of the pie chart correspond to a probability associated with a combination of members of different attribute sets.

15. The system of claim 10, wherein the system is configured to receive user input to define at least two further values of selection probability associated with the members, resulting in a further selection probability associated with the members defined for a later moment in time, and the selector is configured to select at least another media item based on an adapted probability that is between the select probability and the further selection probability.

16. The system of claim 5, including a media player that is configured to render the select media item.

17. The system of claim 5, including a display that is configured to illustrate one or more operations of the selector.

18. The system of claim 17, wherein the display is configured to display a pie-chart corresponding to the selection probabilities, and selecting by the selector is illustrated via a spinning of the pie-chart.

\* \* \* \* \*